No. 654,424. Patented July 24, 1900.
S. M. TINDER & C. H. DILL.
STATION INDICATOR.
(Application filed Dec. 6, 1899.)
(No Model.) 2 Sheets—Sheet 1.
Fig. 1.
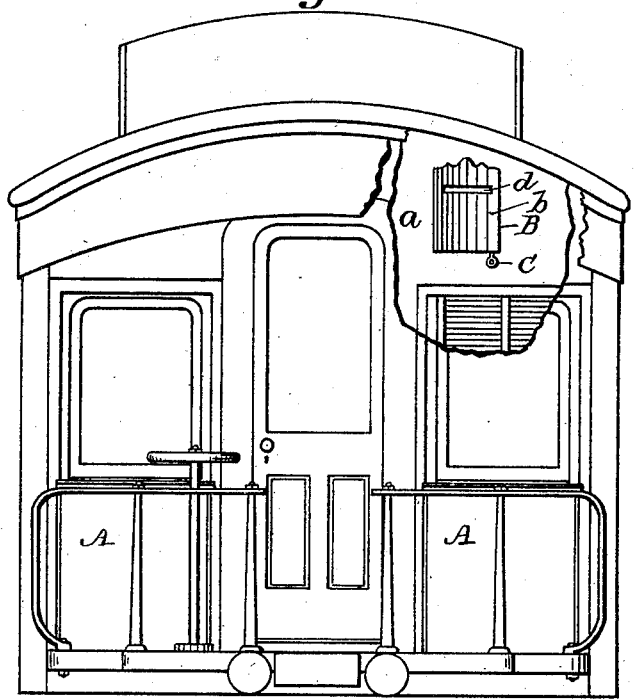
Fig. 2.
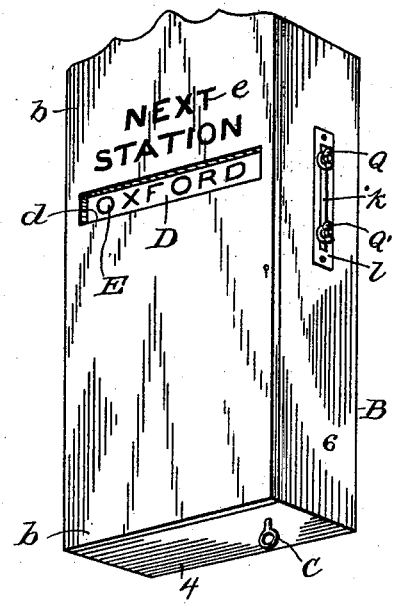
Fig. 3. Fig. 4. Fig. 5.
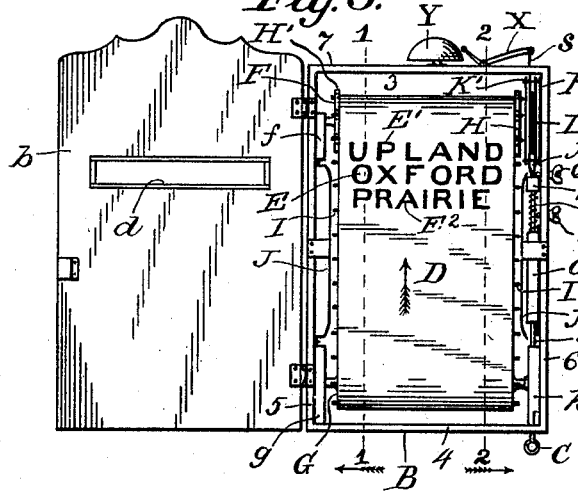
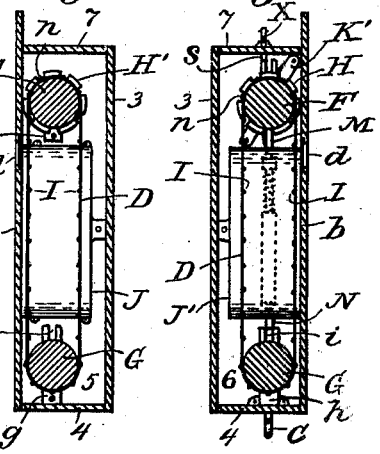
Witnesses:
D. L. Stine
T. Cromwell
Inventors:
Simeon M. Tinder,
Charles H. Dill,
By E. T. Silvius,
Attorney.
THE NORRIS PETERS CO., PHOTO-LITHO., WASHINGTON, D. C.

No. 654,424. Patented July 24, 1900.
S. M. TINDER & C. H. DILL.
STATION INDICATOR.
(Application filed Dec. 6, 1899.)
(No Model.) 2 Sheets—Sheet 2.
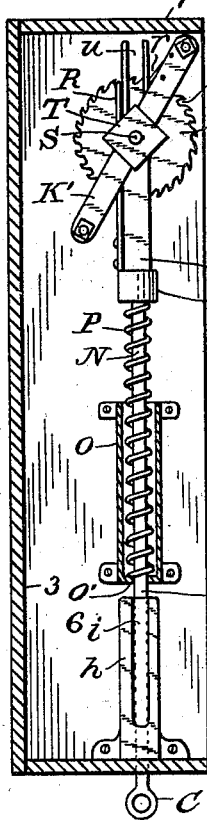
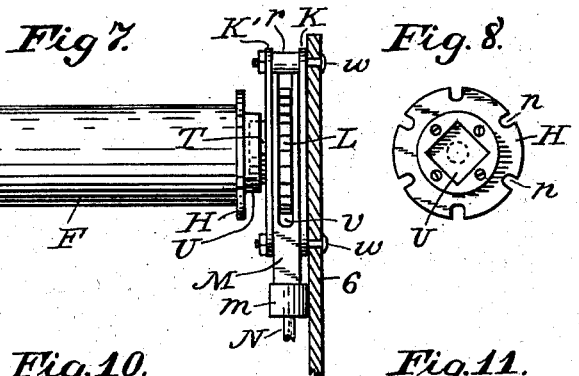
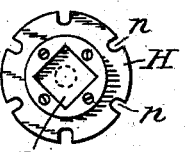
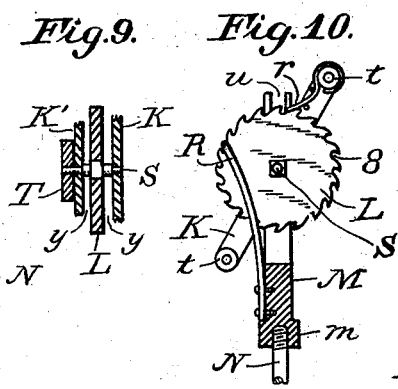
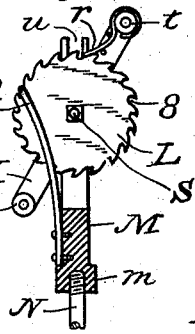
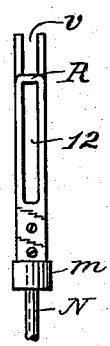
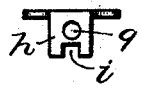
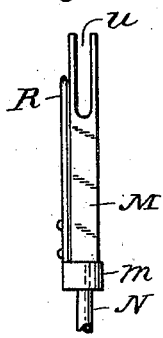
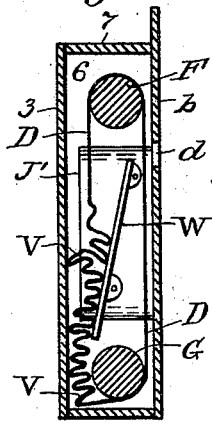
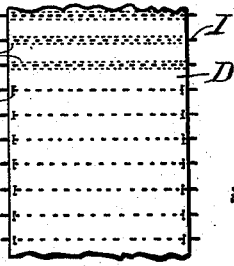
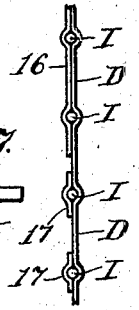
Witnesses:
D. L. Sting
T. Cromwell
Inventors:
Simeon M. Tinder
Charles H. Dill
By E. T. Silvius, Attorney.
THE NORRIS PETERS CO., PHOTO-LITHO., WASHINGTON, D. C.

United States Patent Office.

SIMEON M. TINDER AND CHARLES H. DILL, OF DANVILLE, INDIANA.

STATION-INDICATOR.

SPECIFICATION forming part of Letters Patent No. 654,424, dated July 24, 1900.

Application filed December 6, 1899. Serial No. 739,339. (No model.)

*To all whom it may concern:*

Be it known that we, SIMEON M. TINDER and CHARLES H. DILL, citizens of the United States, residing at Danville, in the county of Hendricks and State of Indiana, have invented certain new and useful Improvements in Station-Indicators; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to an appliance that is designed to be mounted in a passenger-car of either the steam-railway or the street-railway type; and it consists in improved apparatus whereby the names of stations or of cross-streets may be indicated to the passengers in the car as the car approaches the stations.

It consists also in a new and novel web whereon the names of the stations are carried, and the invention consists, further, in certain details of construction hereinafter specified and claimed.

Our object is to provide an indicator of this description which may be cheaply constructed and capable of operation manually with the least amount of attention and which may be also employed economically in station-buildings and elsewhere for making visible instead of oral announcements, thus insuring greater accuracy.

Referring to the drawings, Figure 1 represents an end elevation of a passenger-car body in which a portion is broken away and disclosing our indicator mounted in a suitable position at the inside of the opposite end of the car; Fig. 2, a perspective view of the indicator; Fig. 3, a front elevation of the indicator as it appears when the door thereof is open; Fig. 4, a vertical transverse sectional view taken on a line 1 1 in Fig. 3 with the door closed; Fig. 5, a vertical transverse sectional view taken on a line 2 2 in Fig. 3 with the door closed; Fig. 6, an enlarged vertical transverse sectional view taken on a line 2 2 in Fig. 3, but with part of the mechanism omitted, so as to disclose other parts, of which some are in section; Figs. 7, 8, 9, 10, 11, and 12, detail views of parts of the mechanism; Fig. 13, a transverse fragmentary sectional view taken on a line 2 2 in Fig. 3, illustrating the advantages of our improved web; and Figs. 14, 15, 16, and 17, details of construction.

Similar letters and numerals of reference throughout the drawings designate similar parts.

In practically carrying out our invention we provide a suitable case B, which preferably is composed of wood, with such exterior ornamentation as may be desired, and embracing a back 3, a bottom 4, a left side 5, a right side 6, a top 7, and a hinged door $b$, in which is an aperture $d$, preferably covered with glass, through which the names of the stations may be read, as E E' E², &c., as they may appear on the movable web D. Above the sight-aperture $d$ a suitable sign $e$ is preferably placed, such as "Next station" or "Next street," and the exterior space below the aperture is suitable for display advertisements.

At the interior of the case, near the top thereof, is a driving-roller F, which carries the web D and controls its movements, and near the bottom of the case is a companion idler-roller G, preferably arranged so that it may rise and fall in its bearings, which is suitably accomplished by providing bracket-bearings $g$ and $h$, each having a vertical journal-way $i$ and secured to the case. This roller G is for the purpose of stretching the web sufficiently to prevent folds and creases in the portion thereof which is presented at the sight-opening $d$.

The roller F is provided with recesses to receive metallic rods I, secured transversely to the web to insure registering of the station-names, such as at E, with the sight-aperture $d$. Such recesses are preferably formed in the peripheries of disks secured to the ends of the roller, as a disk H or H', having the recesses or notches $n$ extending inward to the periphery of the roller; but, if desired, such recesses may extend across the face of the roller also. The disk H' has an axle 10, journaled in a bracket $f$, having an open-top bearing, so that the axle may be lifted therefrom when webs require renewing or changing. The disk H has a socket U, in which a square plate T, attached rigidly to the driving-shaft S, is inserted, thus providing an axle and a driver for the roller. The shaft S is journaled in a housing which may suitably be composed of a pair of parallel plates K and K', coupled together at their ends by bolts $w$ $w$, with spacing-thimbles $t$ between and secured to the side 6 of the case. A ratchet-wheel L, having undercut notches 8, is secured to the shaft S between the housing-plates, with a space $y$ at each side thereof to accommodate the blades of the bifurcated end of the pull-bar M, which is bifurcated in both directions transversely, so that an opening $u$ is provided to receive the shaft S, by which the bar is guided in its longitudinal movement, and an opening $v$ is provided in which the ratchet-wheel works. Attached to each pull-bar is a spring-yoke R, having an opening 12, through which the ratchet-wheel L works, and the loop or end of the yoke engages the ratchet-teeth at one side of the center of the wheel L, so as to draw downward and rotate the wheel, the yoke bending outward, as shown in Fig. 10. A pawl is provided to hold the wheel L while the yoke is making its return or backing movement, a suitable form being that shown at $r$. At the lower end $m$ of the pull-bar a stem N is attached and extends down through a spring-case O, through an opening 9 in the bracket-bearing $h$, and through the bottom 4 of the case, terminating in a handle C below. The spring-case O has an apertured bottom O' and is secured to the side 6 or to the back of the case. Upon the bottom O' is seated a spring P, coiled about the stem N and bearing against the end $m$ of the pull-bar, so that the latter is normally spring-pressed upward, the bottom of the opening $u$ being a stop for the bar, while the end $m$ in a reverse movement may be stopped against the top of the spring-case, although we preferably provide separate adjustable stops Q and Q', between which the enlarged end $m$ plays, the stops being mounted in a plate $l$, having a slot $k$, the stops extending through a similar slot in the side of the case and secured by means of thumb-screws.

Lateral guides J and J' are preferably provided for the web D and may be suitably made of tin-plate and secured to the case.

In most cases a continuous web D may accommodate the necessary number of station-names when of sufficient length to run stretched over the pair of rollers, the lower roller being supported by the web; but when a large number of stations are desired to be placed upon the web we may increase its length sufficiently and allow the greater portion of it to fold over at the back, as at V V, Fig. 13, the roller G then running in its bearings, in which case we preferably provide a suitably-secured partitional guide W to prevent the folded portions of the web from interfering with the stretched portion at the front, which moves upward, as indicated by the arrow in Fig. 3.

The web D may be made of any suitable flexible material to which we secure a series of rods I for the purpose of insuring accuracy or positive movement of the web and to also serve as weights, operating, as before indicated, in connection with the roller F, the rods preferably projecting at the sides of the web. The rods preferably have each an eye 15 at each end, whereby to secure it to the web, which may have either a lining 16, between which and the web the rods may be inclosed and further secured by means of stitching, as at 13, or welts 17 may be used and only end stitching, as at 14, employed.

In order to attract attention to the stations indicated, we provide a gong Y, mounted upon the top of the case, which is struck each time the web is shifted by a suitably-connected hammer, as X, pivoted to the case and connected by a rod S, attached to the upper end of the pull-bar M in a suitable manner.

The case B may be secured at any convenient position to the inner wall $a$ of a car, and the handle may be reached by the hand of such employees as are usually employed for other purposes, or a cord may be attached to the handle and extend to any desired part of the car, so that a motorman or a conductor may operate the indicator from a distance. It is intended that when leaving a station or street the handle C be pulled down until mechanically stopped, when a change of names occurs at the sight-aperture $d$ and the gong sounds, the outer face of the web D being covered with names, an example only of which is shown in Fig. 3. A duplicate list of stations may be placed on a single web in reversed order, so that it may be used for round trips continuously, thus obviating the necessity of changing webs while a car remains on a given route.

Having thus described our invention, what we claim as new, and desire to secure by Letters Patent, is—

1. A station-indicator including a driving-roller, a driving-shaft detachably connected to one end of the driving-roller, a ratchet-wheel secured to the driving-shaft, a pull-bar guided by the driving-shaft, and a yoke attached to the pull-bar and engaging the ratchet-wheel.

2. A station-indicator including a case, a continuous web, a driving-roller supporting the web, an idler-roller journaled in bearings at the bottom of the case, side guides for the web attached to the sides of the case, and a slanting guide-plate extending between the side guides and attached thereto.

3. A station-indicator including a case, a driving-shaft mounted independently in a frame having two sides, a ratchet-wheel secured to the driving-shaft between the two sides of the frame, a driving-roller socketed to the driving-shaft, a pull-bar having a bifurcated end straddling the driving-shaft, a yoke secured to the pull-bar and engaging the ratchet-wheel, stops for limiting the longitudinal movement of said pull-bar, a spring coiled about said pull-bar, a guide-case for said pull-bar, and a web on said driving-roller.

4. The combination with a car, of the case attached to the interior of the car, the apertured door for the case, the driving-shaft frame having two side plates and attached to one side of the case, the journal-box attached to the opposite side of the case, the driving-shaft mounted in said frame, the driving-roller detachably connected at one end to said driving-shaft and journaled at its opposite end in said journal-box, the ratchet-wheel secured to said shaft between said frame sides, the bifurcated pull-bar, the yoke secured to said pull-bar and engaging said ratchet-wheel, the pawl attached to said frame and engaging said ratchet-wheel, the web, the lateral guides, the spring coiled about said pull-bar, the pull-bar case, and the stops for the pull-bar.

5. In a station-indicator, the combination of the case, the driving-shaft frame having the double plates, the driving-shaft journaled in said frame, the ratchet-wheel secured to said shaft between said double plates, the pull-bar having the four prongs at the upper end thereof and straddling said shaft and said wheel, the yoke secured to said pull-bar adjacent to said prongs and engaging said wheel, the pawl, the continuous web, the rods attached to said web, the driving-roller socketed to said shaft and having the notches for said rods and carrying said web, the idler-roller, the spring coiled about said pull-bar, and the stops, substantially as set forth.

6. In a station-indicator, the combination of the case, the door for the case, the driving-shaft, the frame having two side plates supporting the driving-roller, the ratchet-wheel secured to said shaft in said frame, the driving-roller detachably supported at one end by said shaft, the pull-bar having the slotted end, the yoke attached to said slotted end, the pawl, the coiled pull-bar spring, the web, the guide-plate slanting from near said door downwardly to near the back of the case, the idler-roller, and the side guide, substantially as set forth.

7. In a station-indicator, the combination of the case, the door having the sight-aperture, the driving-roller, the web mounted upon the driving-roller, the recesses in the driving-roller, the rods attached to the web and registering with and engaging the recesses in the driving-roller, the lateral guides for the web, the driving-shaft mounted independently and actuating the driving-roller, the ratchet-wheel secured to such driving-shaft, the pull-bar operating the ratchet-wheel, the stops for the pull-bar, the pull-bar spring, the pull-bar stem, the handle on the pull-bar, the pawl engaging the ratchet-wheel, and the gong operated by the pull-bar, substantially as set forth.

In testimony whereof we affix our signatures in presence of two witnesses.

SIMEON M. TINDER.
CHARLES H. DILL.

Witnesses:
 CHAS. HOLLOWELL,
 C. E. HARLAN.